United States Patent
Margetts et al.

(10) Patent No.: US 7,227,886 B2
(45) Date of Patent: Jun. 5, 2007

(54) SYNCHRONIZATION STRATEGY AND ARCHITECTURE FOR SPREAD-SPECTRUM RECEIVERS

(75) Inventors: Adam Robert Margetts, Plainsboro, NJ (US); Louis Robert Litwin, Jr., Plainsboro, NJ (US)

(73) Assignee: Thomson Licensing, Boulogne-Billancourt ( * ) Notice: Subject to any disclaimer, the term of this patent is extended or adjusted under 35 U.S.C. 154(b) by 785 days.

(21) Appl. No.: 10/207,614

(22) Filed: Jul. 29, 2002

(65) Prior Publication Data

US 2004/0017845 A1    Jan. 29, 2004

(51) Int. Cl.
    *H04B 1/00*    (2006.01)
(52) U.S. Cl. .................. 375/149; 375/130; 375/354
(58) Field of Classification Search ................ 375/130,
    375/149, 152, 343, 240.28, 354, 140, 147,
    375/240.01, 240.24, 316, 340, 240
    See application file for complete search history.

(56) References Cited

U.S. PATENT DOCUMENTS

| 4,926,440 | A |  | 5/1990 | Mikoshiba et al. |
| 5,216,691 | A |  | 6/1993 | Kaufmann |
| 5,894,494 | A |  | 4/1999 | Davidovici |
| 5,982,763 | A | * | 11/1999 | Sato ........................... 370/342 |
| 6,204,812 | B1 |  | 3/2001 | Fattouche .................. 342/457 |
| 6,256,337 | B1 |  | 7/2001 | Hendrickson et al. |
| 6,259,724 | B1 | * | 7/2001 | Esmailzadeh ............... 375/143 |
| 6,760,360 | B1 | * | 7/2004 | Kawai ......................... 375/130 |
| 2004/0052319 | A1 | * | 3/2004 | Wakamatsu ................. 375/343 |

* cited by examiner

*Primary Examiner*—Pankaj Kumar
*Assistant Examiner*—Naheed Ejaz
(74) *Attorney, Agent, or Firm*—Joseph J. Laks; Robert B. Levy

(57) ABSTRACT

An apparatus for synchronizing the reception of a spread-spectrum signal includes a synchronization apparatus having a code-matched filter, a running average unit coupled to the filter, a peak detector coupled to the running average unit, and a synchronizer coupled to the peak detector for providing an index of a peak. A corresponding method includes receiving a spread-spectrum signal having a period comprising a plurality of indexable samples, maintaining a mean array comprising a running mean value for each indexable sample over a variable number of periods, detecting a peak value of the array, calculating an average value of the array, computing a peak-to-average ratio in accordance with the detected peak value and the calculated average value, comparing the peak-to-average ratio against a time-varying threshold, and synchronizing the received signal when the peak-to-average ratio exceeds the current value of the threshold.

17 Claims, 6 Drawing Sheets

SYNCHRONIZATION STRATEGY AND ARCHITECTURE FOR SPREAD-SPECTRUM RECEIVERS

BACKGROUND

The present disclosure relates to spread-spectrum communications and, in particular, to a method and apparatus for providing synchronization of Wideband Code Division Multiple Access ("WCDMA") receivers. In typical spread-spectrum communications systems, a system designed for a worst-case low signal-to-noise ratio ("SNR") scenario averages the incoming signal over a fixed number of slots, thereby unnecessarily increasing the synchronization time when the SNR is high.

Unfortunately, the channel conditions and SNR in a mobile environment may change very rapidly, and the SNR levels in a spread-spectrum system, such as, for example, a WCDMA system, are typically low for worst-case scenarios. Accordingly, what is needed is a strategy and architecture for providing synchronization of WCDMA receivers that is responsive to varying SNR conditions so that the synchronization time is not unnecessarily increased when the SNR is high.

SUMMARY

These and other drawbacks and disadvantages of the prior art are addressed by a method and apparatus for providing synchronization of spread-spectrum receivers.

A synchronization apparatus for synchronizing the reception of a spread-spectrum signal includes a code-matched filter, a running average unit in signal communication with the code-matched filter, a peak detector in signal communication with the running average unit, and a synchronizer in signal communication with the peak detector for providing an index of a peak.

A corresponding method for synchronizing the reception of a spread-spectrum signal includes receiving a spread-spectrum signal having a period comprising a plurality of indexable samples, maintaining a mean array comprising a running mean value for each indexable sample over a variable number of periods, detecting a peak value of the maintained mean array, calculating an average value of the maintained mean array, computing a peak-to-average ratio in accordance with the detected peak value and the calculated average value, comparing the peak-to-average ratio against a time-varying threshold, and synchronizing the received signal when the peak-to-average ratio exceeds the current value of the time-varying threshold.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a method and apparatus for providing synchronization of spread-spectrum receivers, including Wideband Code Division Multiple Access receivers, in accordance with the following exemplary figures, in which.

DETAILED DESCRIPTION OF PREFERRED EMBODIMENTS

The present disclosure relates to spread-spectrum communications and, in particular, to a method and apparatus for providing synchronization of spread-spectrum receivers, including Wideband Code Division Multiple Access ("WCDMA") receivers. Embodiments of the present disclosure include hand-held cellular devices usable in spread-spectrum communications systems.

A synchronization strategy and architecture are disclosed for communications receivers that are compliant with the WCDMA standard. The disclosed method and apparatus may also be applied to other types of spread-spectrum receivers. An adaptive threshold is used for determining a synchronization lock. This allows the receiver to synchronize quickly in situations with a high signal-to-noise ratio ("SNR"), while the receiver is allowed to take longer in situations with a low SNR in order to reliably determine if the receiver has correctly synchronized to the received signal.

In spread-spectrum communications systems, the base station typically transmits a periodic synchronization code that is known a priori by the receiver. The receiver employs a matched filter to find the correlation peak and then synchronize with the base station. Under low SNR conditions, averaging must be done over several code periods or slots to separate the peak from noise and interference. A dynamic decision is made to determine the number of slots over which to average.

Figure 1:
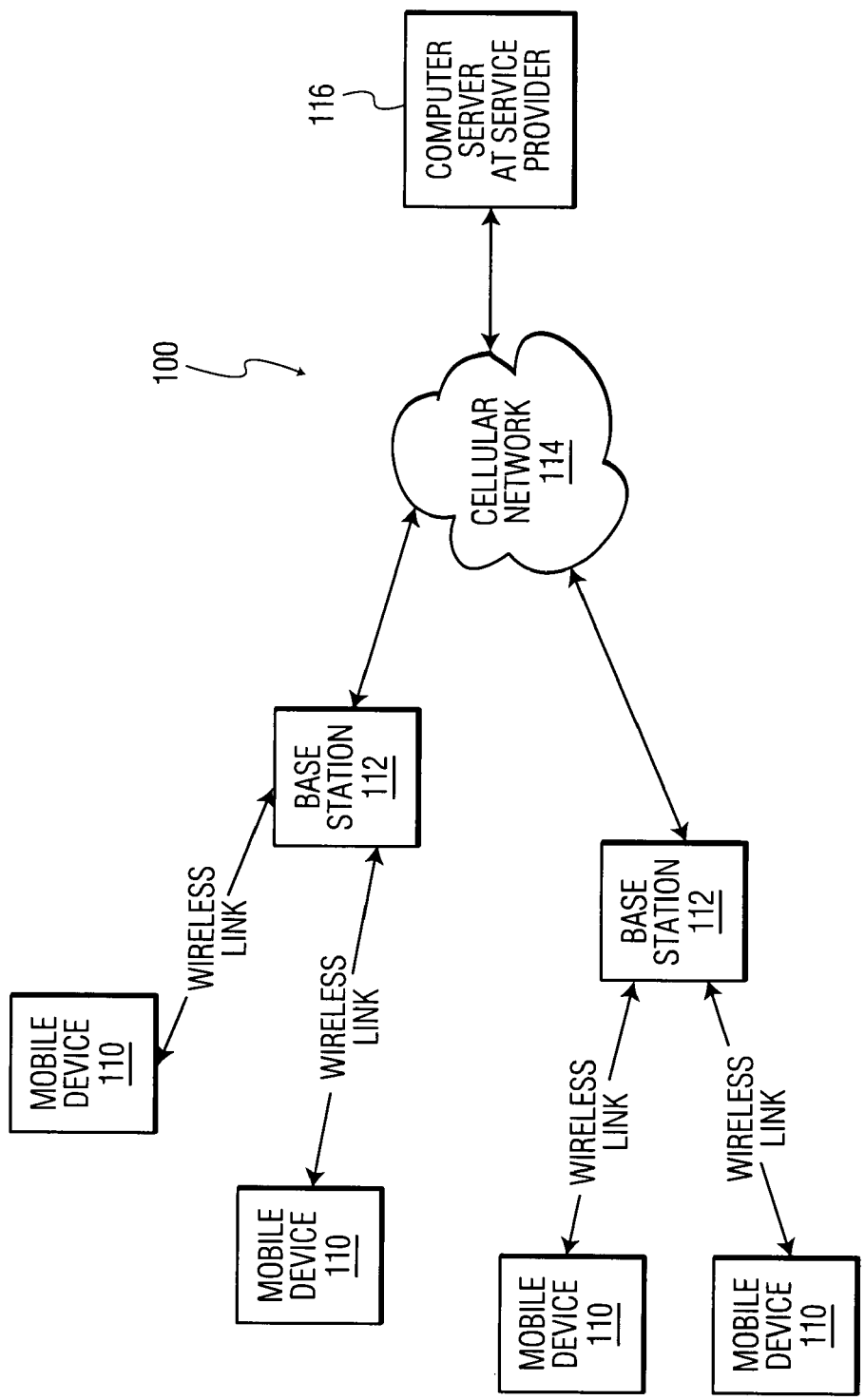
FIG. 1 shows a block diagram for a spread-spectrum communications system according to an illustrative embodiment of the present disclosure.

As shown in FIG. 1, a spread-spectrum communications system 100 includes spread-spectrum communications devices 110, such as, for example, mobile cellular telephone embodiments. The communications devices 110 are each connected in signal communication to a base station 112 via spread-spectrum wireless links. Each base station 112, in turn, is connected in signal communication with a cellular network 114. A computer server 116, such as, for example, a server residing with a cellular service provider, is connected in signal communication with the cellular network 114. Thus, a communications path is formed between each cellular communications device 110 and the computer server 116.

Figure 2:
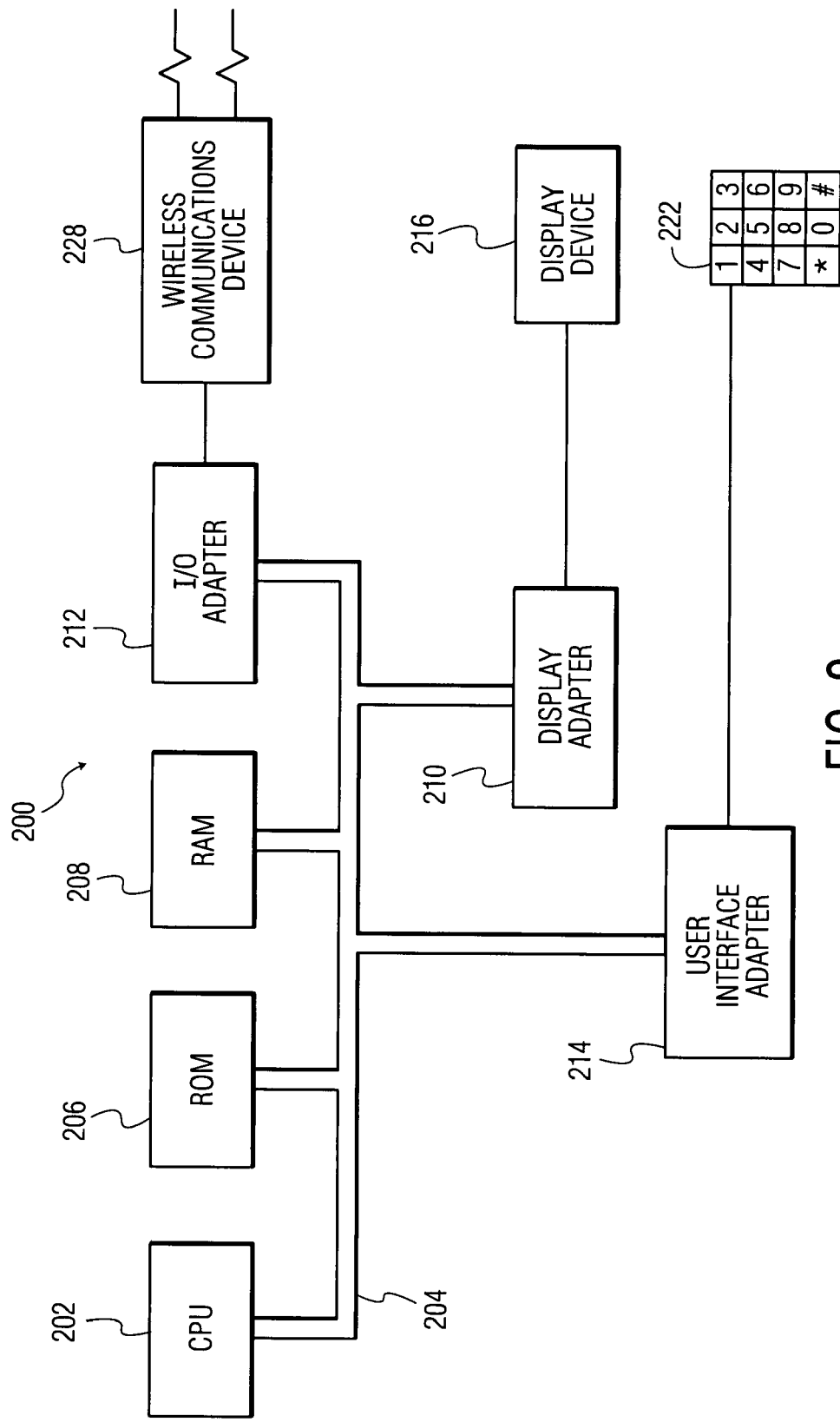
FIG. 2 shows a block diagram for a spread-spectrum hand-held communications apparatus usable in accordance with the system of FIG. 1.

Turning to FIG. 2, a spread-spectrum communications apparatus is generally indicated by the reference numeral 200. The communications apparatus 200 may be embodied, for example, in a mobile cellular telephone according to embodiments of the present disclosure. The communications apparatus 200 includes at least one processor or Central Processing Unit ("CPU") 202 in signal communication with a system bus 204. A Read Only Memory ("ROM") 206, a Random Access Memory ("RAM") 208, a display adapter 210, an Input/Output ("I/O") adapter 212, and a user interface adapter 214 are also in signal communication with the system bus 204.

A display unit 216 is in signal communication with the system bus 204 via the display adapter 210, and a keypad 222 is in signal communication with the system bus 204 via the user interface adapter 214. The apparatus 200 also includes a wireless communications device 228 in signal communication with the system bus 204 via the I/O adapter 212, or via other suitable means as understood by those skilled in the art.

As will be recognized by those of ordinary skill in the pertinent art based on the teachings herein, alternate embodiments of the communications apparatus 200 are possible. For example, alternate embodiments may store some or all of the data or program code in registers located on the processor 202.

Figure 3:
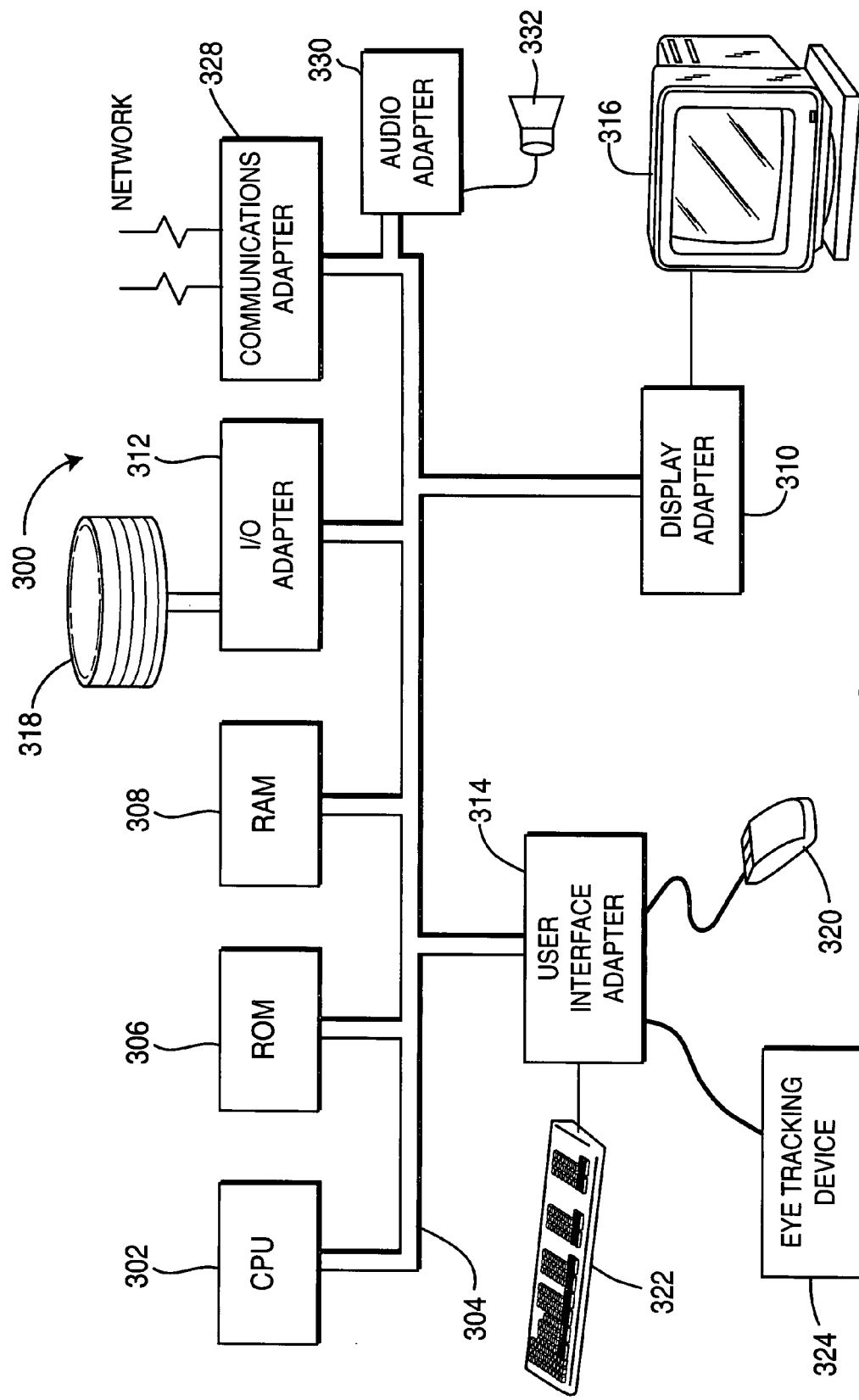
FIG. 3 shows a block diagram for a service provider computer server usable in accordance with the system of FIG. 1.

Turning now to FIG. 3, a service provider computer server is indicated generally by the reference numeral 300. The server 300 includes at least one processor or CPU 302 in signal communication with a system bus 304. A ROM 306, a RAM 308, a display adapter 310, an I/O adapter 312, and a user interface adapter 314 are also in signal communication with the system bus 304.

A display unit 316 is in signal communication with the system bus 304 via the display adapter 310. A data storage unit 318, such as, for example, a magnetic or optical disk storage unit or database, is in signal communication with the system bus 104 via the I/O adapter 312. A mouse 320, a keyboard 322, and an eye tracking device 324 are also in signal communication with the system bus 304 via the user interface adapter 314.

The server 300 also includes a communications adapter 328 in signal communication with the system bus 304, or via other suitable means as understood by those skilled in the art. The communications adapter 328 enables the exchange of data between the server 300 and a network, for example.

As will be recognized by those of ordinary skill in the pertinent art based on the teachings herein, alternate embodiments of the service provider computer server 300 are possible, such as, for example, embodying some or all of the computer program code in registers located on the processor chip 302. Given the teachings of the disclosure provided herein, those of ordinary skill in the pertinent art will contemplate various alternate configurations and implementations of elements of the server 300 while practicing within the scope and spirit of the present disclosure.

Figure 4:
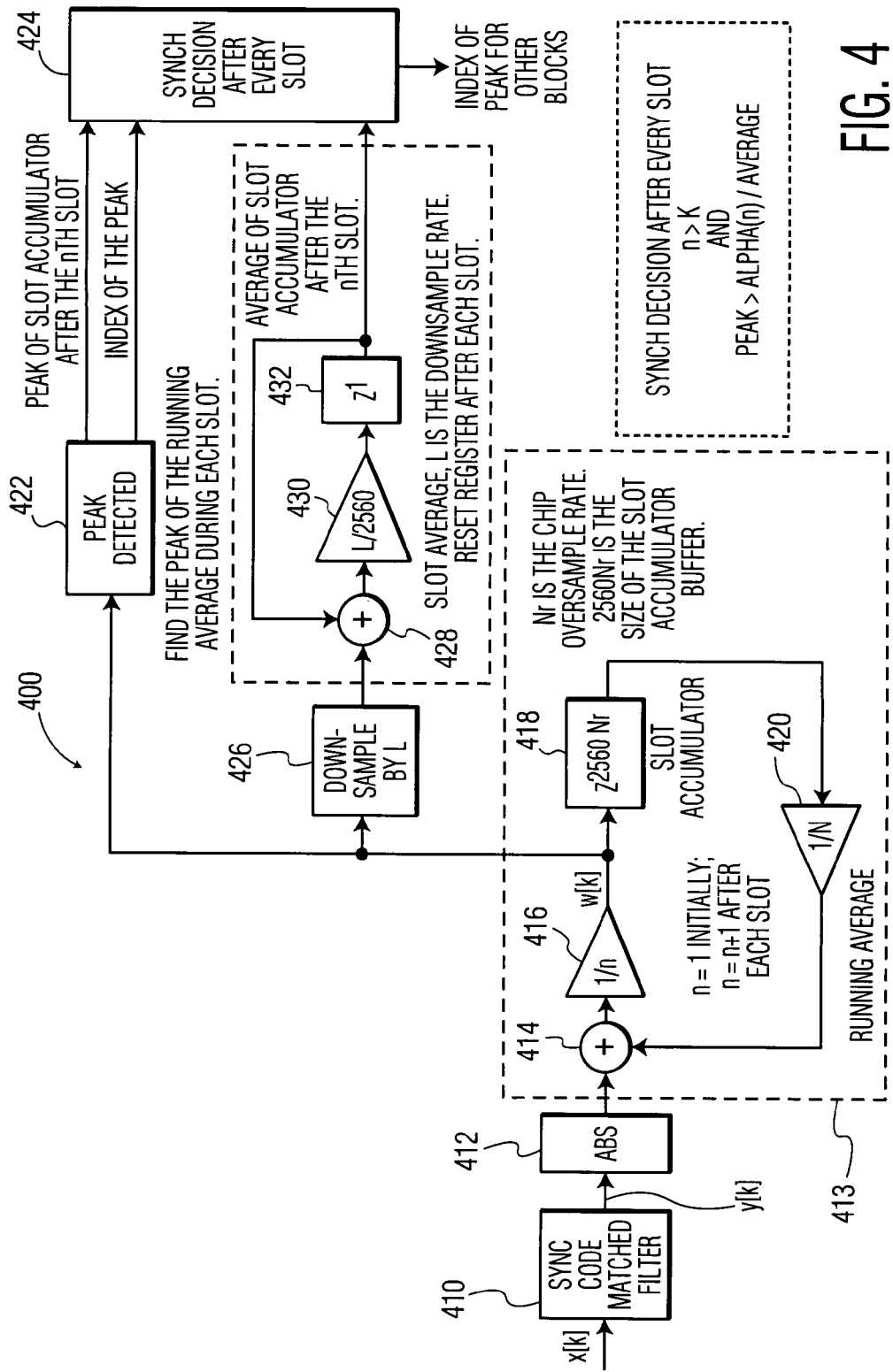
FIG. 4 shows a block diagram hardware architecture for synchronization of Wideband Code Division Multiple Access receivers usable in the apparatus of FIG. 2.

As shown in FIG. 4, a block diagram for an exemplary hardware architecture implementation of a synchronization strategy is indicated generally by the reference numeral 400. The hardware architecture 400 is usable in the apparatus of FIG. 2 for synchronization of Wideband Code Division Multiple Access ("WCDMA") receivers. The hardware 400 includes a matched filter 410 for detecting a synchronization code. The filter 410 is coupled in signal communication to an absolute value function block 412, which, in turn, is coupled to a running average unit 413. The running average unit 413 includes a first positive input of a summing block 414. The summing block 414 is coupled to a 1/n amplifier 416, where n is initially equal to 1 and incremented by 1 after each slot. The amplifier 416 is coupled to a digital slot accumulator 418 for computing $z^{-2560*Nr}$, where Nr is the chip over-sampling rate and 2560*Nr is the size of a slot accumulator buffer. The accumulator 418 is coupled, in turn, to an amplifier 420 for computing a running average. The output of the amplifier 420 is coupled in signal communication to a second positive input of the summing block 414.

The amplifier 416 is also coupled in signal communication to a peak detection block 422, for finding the peak of the running average during each slot. A first output of the detection block 422 is indicative of the peak of the slot accumulator after the nth slot, and is coupled to a first input of a synchronization decision block 424 for determining whether synchronization has been achieved after every slot. A second output of the detection block 422 is indicative of the index of the peak, and is coupled to a second input of the synchronization decision block 424.

The amplifier 416 is further coupled in signal communication to a down-sampling block 426 for down-sampling at a rate L. The down-sampling block 426 is coupled to a slot averaging unit 427. The slot-averaging unit 427 includes a first positive input of a summing block 428. The summing block 428 is coupled, in turn, to an amplifier 430 for computing the slot average L/2560, where L is the down-sampling rate. The amplifier 430 is coupled to a unit delay 432, which output is fed back to a second positive input of the summing block 428. The output of the unit delay 432 is indicative of the average of the slot accumulator after the nth slot, and is further coupled to a third input of the synchronization decision block 424. The output of the synchronization decision block 424 indicates the index of the peak for the other blocks.

Figure 5:
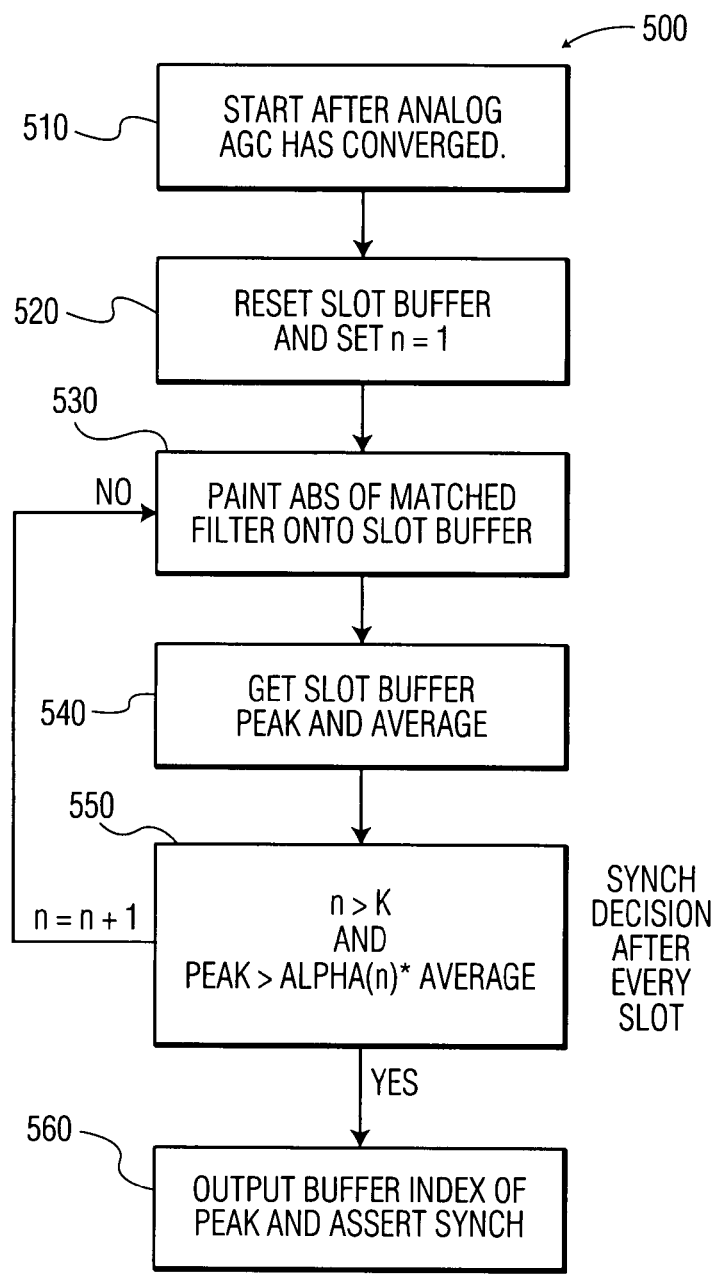
FIG. 5 shows a flow diagram for synchronization of Wideband Code Division Multiple Access receivers in the apparatus of FIG. 4.

Turning to FIG. 5, a flow diagram for a synchronization strategy for Wideband Code Division Multiple Access ("WCDMA") is indicated generally by the reference numeral 500. The synchronization strategy exemplified by the flow diagram 500 is usable in correspondence with the apparatus of FIG. 4. The diagram 500 includes a start function block 510. The start block 510 starts the synchronization process after the analog automatic gain control ("AGC") has converged, and passes control to a reset function block 520. The reset block 520 resets the slot buffer and sets the counter n equal to 1, and then passes control to a "paint" function block 530. The "paint" block 530 takes the new slot samples and combines them with the previous slot samples such that a running average is accomplished.

Thus, the paint block 530 paints the absolute value of the matched filter onto the slot buffer, and passes control to a function block 540. The function block 540 gets the slot buffer peak and average values, and passes control to a decision block 550. The decision block 550 performs a synchronization decision after every slot. The decision is true if both the counter n is greater than the number of iterations to paint before testing, and the maximum peak of the slot buffer is greater than a time-varying threshold multiplied by the average of the slot buffer. If the decision block 550 is false, then the counter n is incremented by 1 and control is returned to the paint function block 530. If, on the other hand, the decision block 550 is true, then control is passed to a function block 560, which asserts the Synch signal and loads the output buffer with the index of the peak.

As will be recognized by those of ordinary skill in the pertinent art, the teachings of this synchronization strategy are not limited to applications compliant with the WCDMA standard, and can be applied to any spread-spectrum system.

Figure 6:
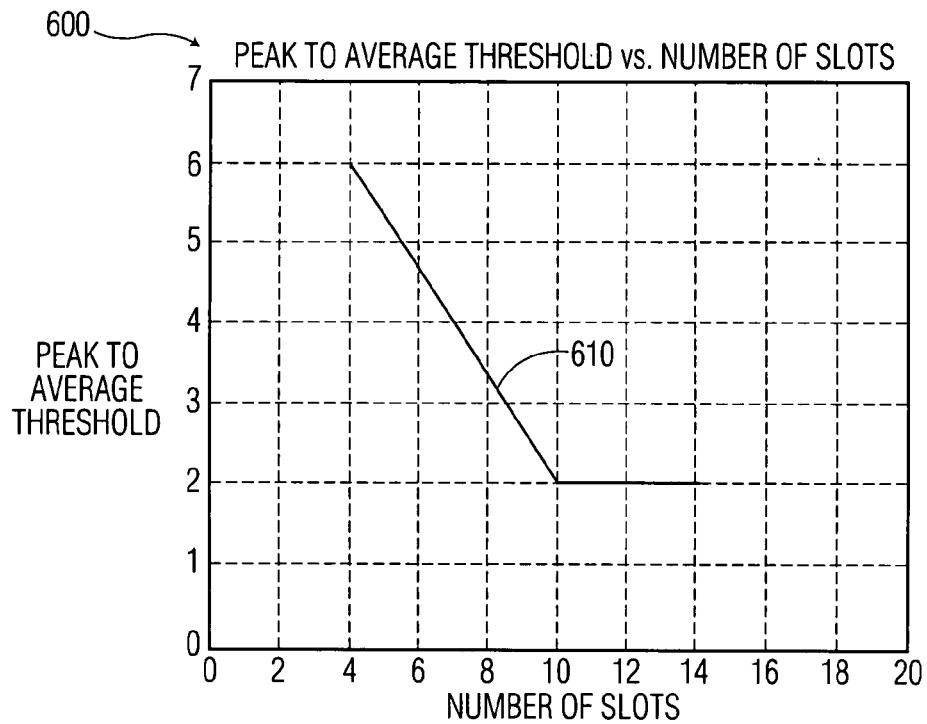
FIG. 6 shows a plot of an exemplary time-varying Peak to Average Ratio Threshold.

Turning now to FIG. 6, a plot of an exemplary time-varying Peak to Average Ratio Threshold is indicated generally by the reference numeral 600. An exemplary varying Peak to Average Ratio Threshold 610 does not have any values prior to slot 4. This is because, in this example, the number of iterations to paint before testing ("K") is equal to 4 slots, so the receiver did not attempt to make a synchronization decision until after that waiting period had expired. This waiting period allows the slot buffer values to stabilize since it needs several samples of data before a meaningful average can be computed. The threshold 610 has a lower limit of 2. The actual value of the lower limit can vary for different situations and/or according to design criteria. It is desirable to have a bound on this time-varying lower limit so that the limit does not eventually go to zero, even in cases of low SNR, or this might cause the receiver to synchronize with a false lock.

Figure 7:
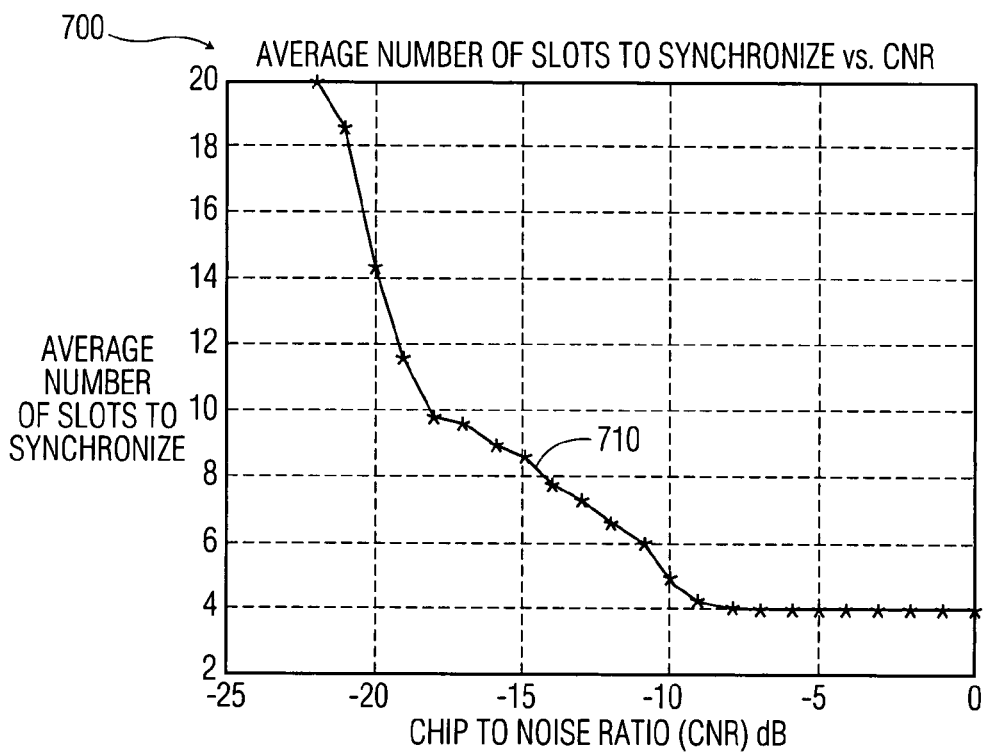
FIG. 7 shows a plot of the Average Number of Slots to Synchronization versus chip-to-noise ratio.

As shown in FIG. 7, a graph of the Average Number of Slots to Synchronization versus Chip-to-Noise Ratio ("CNR") is indicated generally by the reference numeral 700. Use of the threshold 610 of FIG. 6 leads to the graph 700. FIG. 7 shows a plot 710 of the Average Number of Slots to Synchronization versus the CNR. The plot 710 shows that the presently disclosed synchronization technique significantly reduces the time that the receiver takes for synchronization to the base station under higher CNR conditions, such as, for example, CNRs above −20 dB.

Thus, the present disclosure teaches synchronization strategies and architectures for spread-spectrum communications receivers, including those that are compliant with the Wideband Code Division Multiple Access ("WCDMA") standard. It shall be understood by those of ordinary skill in the pertinent art that embodiments of the present disclosure can be used in any spread-spectrum system. In particular, embodiments are contemplated for use in a cellular receiver that is compliant with the WCDMA and Code Division Multiple Access "cdma2000" standards.

In a WCDMA system, a signal that the receiver can initially tune to is the Primary Synchronization Channel ("PSCH"). The spreading code for the PSCH signal is known throughout the entire system by all mobile handsets. The receiver synchronizes itself to the PSCH in order to determine chip, symbol and slot synchronization.

During operation in accordance with the WCDMA standard, when a mobile receiver is activated it begins searching for the PSCH in order to obtain chip, symbol and slot timing synchronization. The base station transmits the PSCH in the first 256 chips of each slot. Since the PSCH is periodic and known by the receiver, the receiver may simply buffer the output of a matched filter tuned to the PSCH over a given slot duration of samples. The peak of the buffer will correspond to the strongest base station and the beginning of the slot. However, under low Chip-to-Noise Ratio ("CNR") conditions, the probability of a false lock would be too high because, for example, a peak due to noise might be higher than the peak of correlating to the strongest PSCH.

In order to decrease the probability of a false lock, a strategy of averaging over several slots is used. Averaging reduces the effect of noise because the average value of the peak of the PSCH correlation is much higher than the average value of the noise.

The term "painting" over the slot buffer array is defined to mean taking the new slot samples and combining them with the previous slot samples such that a running average is accomplished. Thus, at time slot_duration*n, the slot buffer contains an average over n slots as defined by Equation 1.

$$\text{Slot\_buffer} = \frac{(n-1) \cdot \text{Slot\_buffer} + \text{NewSlotSamples}}{n}. \quad (1)$$

A running average is performed because it is not known a priori how many slots will be averaged since the number of slots to average is determined on the fly as part of the presently disclosed algorithm. After painting K slots onto the slot buffer, the synchronization algorithm begins to check whether the peak to average ratio is greater than a threshold. A waiting period of K slots is used to allow the slot buffer values to stabilize, since the values in the buffer after the first few slots are not reliable enough to support decisions. By waiting K slots, the running average will have enough time to begin convergence. At this point, the algorithm can begin to make reliable decisions based on the data.

The threshold value is a function of the number of slots that have been painted onto the slot buffer. An example of a varying threshold is shown as the plot 610 of FIG. 6. The lower threshold of 2 in the plot 610 was derived experimentally, and gives rise to the performance plot 710 of FIG. 7, which shows the average number of slots to synchronize versus CNR. The threshold values can vary depending on the situation; however, the threshold will generally decrease over time until it reaches a user-defined and/or preselected lower limit. A large threshold is initially used to prevent a false lock. Since the painting will average the signal to provide a stronger peak over time, the threshold can be subsequently decreased to speed up synchronization.

Experimental results indicate that it takes between 4 and 20 slots to synchronize, depending on the CNR, using a synchronization strategy of the present disclosure. This is an improvement over the typical technique of setting the number of slot averages to a fixed constant before checking for synchronization, such as, for example, using a typical value of 15 slots in WCDMA where a WCDMA frame also comprises 15 slots.

The Peak is the maximum of the slot buffer 418 of FIG. 4, and the Average is the average value of the slot buffer. The average does not have to be computed by adding every element of the slot buffer, and it has been found that a significant amount of down-sampling does not adversely affect the average. Thus, for example, the average can be computed by using every fourth sample or every tenth sample. WCDMA and generic synchronization strategies of the present disclosure are summarized by the following steps.

Synchronization Strategy for WCDMA

Analog Automatic Gain Control ("AGC") is assumed to be working to make sure the received signal is not clipped. The synchronization algorithm does not need the correlation peak to be at a defined reference level because it uses a relative metric.

Match filter to the PSCH and paint samples onto the slot buffer for K slots.

Continue to paint samples onto the slot buffer and determine the peak and average of the slot buffer until the time-varying peak to average ratio threshold, alpha(n), has been satisfied.

Output the location of the peak for further processing.

Synchronization Strategy for Generic Spread-spectrum Systems

Analog Automatic Gain Control ("AGC") is assumed to be working to make sure the received signal is not clipped. The synchronization algorithm does not need the correlation peak to be at a defined reference level because it uses a relative metric.

Match filter to the periodic synchronization code and paint samples onto buffer for K code periods.

Keep painting samples onto buffer until the peak to average ratio threshold, alpha(n) has been satisfied.

Output the location of the peak for further processing.

Thus, the exemplary synchronization strategies of the present disclosure may be applied to any spread-spectrum system using a periodic synchronization code that is known a priori by the receiver. In addition, it shall be recognized by those of ordinary skill in the pertinent art that embodiments of the present disclosure may be applied to any communications system having a periodically transmitted synchronization code.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

The teachings of the present disclosure may be implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory ("RAM"), and Input/Output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

As will be recognized by those of ordinary skill in the pertinent art based on the teachings herein, alternate embodiments are possible. Given the teachings of the disclosure provided herein, those of ordinary skill in the pertinent art will contemplate various alternate configurations and implementations of the system while practicing within the scope and spirit of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for synchronizing the reception of a periodic synchronization signal in a spread spectrum system, the method comprising:

receiving a spread-spectrum signal having a period comprising a plurality of indexable samples;

maintaining a mean array comprising a running mean value for each of the indexable samples over a variable number of periods;

detecting a peak value of the maintained mean array;

calculating an average value of the maintained mean array;

computing a peak-to-average ratio in accordance with the detected peak value and the calculated average value;

comparing the peak-to-average ratio against a time-varying threshold; and synchronizing the received signal when the peak-to-average ratio exceeds a current value of the time-varying threshold.

2. A method as defined in claim 1, further comprising:

indexing the detected peak of the maintained mean array; and providing the index of the detected peak upon synchronization.

3. A method as defined in claim 1 wherein:

each period of the variable number of periods comprises a slot; and each of the samples of the period comprising a chip or a fraction thereof.

4. A method as defined in claim 3 wherein the spread-spectrum signal is a Wideband Code Division Multiple Access signal.

5. A method as defined in claim 1, further comprising:

computing a chip-to-noise ratio; and maintaining the mean array over a greater number of periods prior to synchronization for correspondingly lower computed chip-to-noise ratios.

6. A method as defined in claim 1 wherein said calculating an average value of the maintained mean array comprises down-sampling the maintained mean array such that said peak-to-average ratio is based on a periodic sub-sampling at an integer rate greater than one.

7. A method as defined in claim 1, further comprising filtering the received spread-spectrum signal in accordance with a code to obtain the periodic synchronization signal.

8. A method as defined in claim 1, further comprising decreasing the value of said time-varying threshold until it reaches a lower limit.

9. A method as defined in claim 8 wherein said lower limit is user-defined and greater than zero.

10. An apparatus for synchronizing the reception of a spread-spectrum signal, the apparatus comprising:

means for receiving the spread-spectrum signal having a period comprising a plurality of indexable samples;

means for maintaining a mean array comprising a running mean value for each of the indexable samples over a variable number of periods;

means for detecting a peak value of the maintained mean array;

means for calculating an average value of the maintained mean array;

means for computing a peak-to-average ratio in accordance with the detected peak value and the calculated average value;

means for comparing the peak-to-average ratio against a time-varying threshold; and means for synchronizing the received signal when the peak-to-average ratio exceeds a current value of the time-varying threshold.

11. An apparatus as defined in claim 10, further comprising:

means for indexing the detected peak of the maintained mean array; and means for providing the index of the detected peak upon synchronization.

12. A program storage device readable by computer, tangibly embodying a program of instructions executable by computer to perform method steps for synchronizing the reception of a spread-spectrum signal, the method steps comprising:
- receiving the spread-spectrum signal having a period comprising a plurality of indexable samples;
- maintaining a mean array comprising a running mean value for each of the indexable samples over a variable number of periods;
- detecting a peak value of the maintained mean array;
- calculating an average value of the maintained mean array;
- computing a peak-to-average ratio in accordance with the detected peak value and the calculated average value;
- comparing the peak-to-average ratio against a time-varying threshold; and
- synchronizing the received signal when the peak-to-average ratio exceeds a current value of the time-varying threshold.

13. A program storage device as defined in claim 12, the method steps further comprising:
- indexing the detected peak of the maintained mean array; and
- providing the index of the detected peak upon synchronization.

14. A system (100) for synchronizing the reception of a spread-spectrum signal, the system comprising:
- a communications network (114);
- a plurality of communications devices (110, 200) in signal communication with the communications network, wherein at least one of said communications devices comprises a synchronization apparatus (200, 400);
- means for receiving a spread-spectrum signal having a period comprising a plurality of indexable samples;
- means for maintaining a mean array comprising a running mean value for each of the indexable samples over a variable number of periods;
- means for detecting a peak value of the maintained mean array;
- means for calculating an average value of the maintained mean array;
- means for computing a peak-to-average ratio in accordance with the detected peak value and the calculated average value;
- means for comparing the peak-to-average ratio against a time-varying threshold; and
- means for synchronizing the received signal when the peak-to-average ratio exceeds a current value of the time-varying threshold.

15. A system as defined in claim 14 wherein the synchronization apparatus (400) comprises:
- acode-matched filter (410);
- a running average unit (413) in signal communication with the code-matched filter;
- a peak detector (422) in signal communication with the running average unit; and
- a synchronizer (424) in signal communication with the peak detector for providing an index of a peak.

16. A system as defined in claim 15, the synchronization apparatus (400) further comprising a period averaging unit (427) in signal communication with the running average unit (413) for providing a period average to the synchronizer (424).

17. A system as defined in claim 14, the synchronization apparatus (400) further comprising:
- means for indexing the detected peak of the maintained mean array; and
- means for providing the index of the detected peak upon synchronization.

* * * * *